(12) United States Patent
De Graeve et al.

(10) Patent No.: US 7,765,499 B2
(45) Date of Patent: Jul. 27, 2010

(54) METHOD, SYSTEM, AND COMPUTER PRODUCT FOR FORMING A GRAPH STRUCTURE THAT DESCRIBES FREE AND OCCUPIED AREAS

(75) Inventors: Charles-Marie De Graeve, Saulxures-lès-Nancy (FR); Michael Fiegert, München (DE)

(73) Assignee: Siemens Aktiengesellschaft, Munich (DE)

( * ) Notice: Subject to any disclaimer, the term of this patent is extended or adjusted under 35 U.S.C. 154(b) by 1672 days.

(21) Appl. No.: 10/512,815

(22) PCT Filed: Sep. 19, 2003

(86) PCT No.: PCT/DE03/03121

§ 371 (c)(1),
(2), (4) Date: Oct. 28, 2004

(87) PCT Pub. No.: WO2004/040390

PCT Pub. Date: May 13, 2004

(65) Prior Publication Data

US 2005/0159879 A1   Jul. 21, 2005

(30) Foreign Application Priority Data

Oct. 23, 2002   (DE)   ................ 102 49 422

(51) Int. Cl.
*G06F 17/50* (2006.01)
*G06F 15/18* (2006.01)
*G06E 1/00* (2006.01)
*G06E 3/00* (2006.01)
*G06G 7/00* (2006.01)
*G06N 3/00* (2006.01)

(52) U.S. Cl. ................ 716/4; 706/20; 706/32

(58) Field of Classification Search ............... 716/1–21; 706/20, 32
See application file for complete search history.

(56) References Cited

U.S. PATENT DOCUMENTS 5,150,452 A  9/1992  Pollack et al.
5,491,641 A  2/1996  Scepanovic et al.

(Continued)

FOREIGN PATENT DOCUMENTS

DE   102 47 772.8   11/2003

OTHER PUBLICATIONS

Setalaphruk et al.; "Robot Navigation in Corridor Environments Using a Sketch Floor Map"; Jul. 20, 2003; School of Information Science, Nara Institute of Science and Technology; All pages.*

(Continued)

*Primary Examiner*—Jack Chiang
*Assistant Examiner*—Suresh Memula
(74) *Attorney, Agent, or Firm*—Staas & Halsey LLP

(57) ABSTRACT

A graph structure is generated to describe an area with a free area and an occupied area. In this case a topological graph structure for the free area is determined. A point of the topological graph structure is selected and for this a nearest adjacent occupied area point is determined. For this nearest adjacent occupied area point location information is determined. The graph structure is formed from at least the selected point of the topological graph structure and from the associated location information of the nearest adjacent occupied area point.

16 Claims, 8 Drawing Sheets

U.S. PATENT DOCUMENTS

| | | | | |
|---|---|---|---|---|
| 5,594,503 | A | * | 1/1997 | Miyazawa ............... 348/414.1 |
| 5,937,398 | A | * | 8/1999 | Maeda ......................... 706/32 |
| 6,089,742 | A | | 7/2000 | Warmerdam et al. |
| 6,262,738 | B1 | * | 7/2001 | Gibson et al. ............... 345/419 |
| 2002/0181756 | A1 | * | 12/2002 | Shibuya et al. .............. 382/145 |
| 2003/0179922 | A1 | * | 9/2003 | Peters et al. ................ 382/153 |

OTHER PUBLICATIONS

Tek et al.; "Symmetry Maps of Free-Form Curve Segments via Wave Propagation"; Aug. 2003; LEMS Divsion of Engineering Brown University; All pages.*

Dey et al.; "Approximating the Medial Axis from Vornoi Diagram with a Convergence Guarantee"; Jan. 21, 2003; Algorithmica; pp. 179-207.*

Imiya et al.; "Medial Set, Boundary, and Topology of Random Point Sets"; Jan. 1, 2003; Springer Berlin/Heidelberg; pp. 196-217.*

Nagatani, K. et al., "Sensor Based Navigation for car-like mobile robots using Generalized Voroni Graph," Proceedings of the 2001 IEEE/RSJ Int'l Conf. On Intelligent Robots and Systems, Nov. 3, 2001, pp. 1017-1022.

Jennings, J. et al., "Distributed Map-making and Navigation in Dynamic Environments," Proceedings of the 1998 IEEE/RSJ Int'l Conf. On Intelligent Robots and Systems, Oct. 1998, pp. 1695-1701.

Boada, B. et al., "Localization and Modelling Approach Using Topogeometric Maps," Proceedings of the 2002 IEEE/RSJ Int'l Conf. On Intelligent Robots and Systems, Oct. 2002, pp. 484-489.

Victorino, A. C. et al., "Mobile Robot Navigation Using a Sensor-Based Control Strategy," Proceedings of the 2001 IEEE Int'l Conf. On Robotics & Automation, May 2001, pp. 2753-2758.

Unpublished German Patent Application DE 102 47 772.8 (not translated) was cited in the IDS submitted with the PCT application PCT/DE03/03121 filed on Nov. 19, 2003.

Thrun, S. et al, "Probabilistic Mapping of An Environment By a Mobile Robot," Proceedings of the 1998 IEEE/RSJ Int'l Conf. On Robotics and Automation, May 1998.

Klein, P. et al., "Shape matching using edit-distance: an implementation," 12th Annual ACM-SIAM Symposium on Discrete Algorithms, Dept. of Computer Science, Brown University, 2001.

Hofner, C. et al., "Path Planning And Guidance Techniques For An Autonomous Mobile Cleaning Robot," Int'l Conf. On Intelligent Robots and Systems, 1994, pp. 610-617.

de Carvalho, R. et al., "Complete Coverage Path Planning and Guidance for Cleaning Robots," IEEE Int'l Symposium on Industrial Electronics, 1997, pp. 677-682.

Choset, R. et al. "Coverage Path Planning: The Boustrophedon Cellular Decomposition," Int'l Conf on Field & Service Robotics, 1997, pp. 203-209.

Zelinsky, A. et al., "Planning Paths of Complete Coverage of an Unstructured Environment by a Mobile Robot," Proceedings of '93 Int'l Conf. on Advanced Robotics, Nov. 1 993, pp. 533-538.

Prassler, E. et al., "Autonomous Road Sweeping of Large Public Areas," Robotik 2000, VDI Reports No. 1552, 2000.

Prassler, E. et al., "A Robotic Road Sweeper," Proceedings of the 2000 IEEE Int'l Conf. on Robotics & Automation, Apr. 2000, pp. 2364-2369.

Choset, H. et al., "Topological Simultaneous Localization and Mapping (SLAM): Toward Exact Localization Without Explicit Localization," IEEE Transactions on Robotics and Automation, vol. 17, No. 2, Apr. 2001, pp. 125-137.

Zwynsvoorde, D. V. et al., "Incremental Topological Modeling Using Local Voronoï-like Graphs," IEEE Int'l Conf. On Intelligent Robots and Systems 2000.

Zwynsvoorde, D. V. et al., "Building topological models for navigation in large scale environments," LAAS-CNRS, 2001.

Thrun, S., "Robotic Mapping: A Survey," School of Computer Science, Carnegie Mellon University, Feb. 2002.

Elfes, A., "Occupancy Grids: A probabilistic framework for robot perception and navigation," Dept. of Electrical and Computer Engr., Carnegie Mellon University, May 1989.

Moravec, H., "Sensor Fusion in Certainty Grids for Mobile Robots," AI Magazine, Summer 1988, p. 61-74.

* cited by examiner

FIG 3
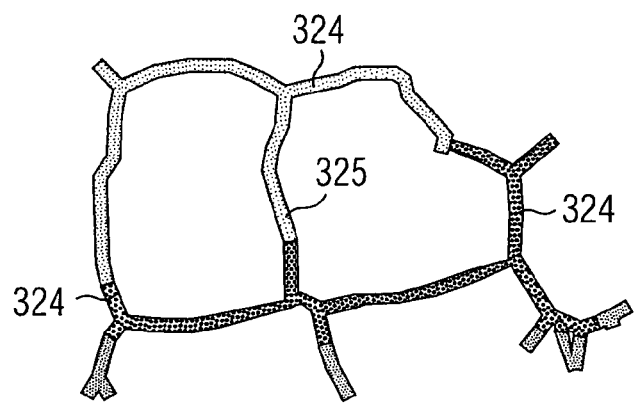
FIG 4
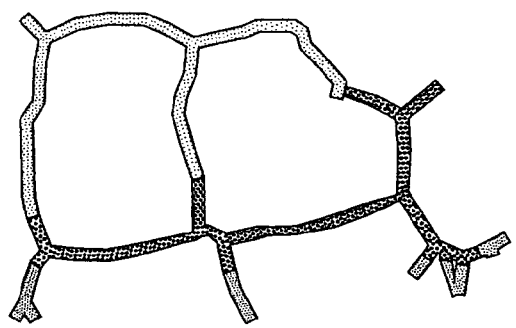
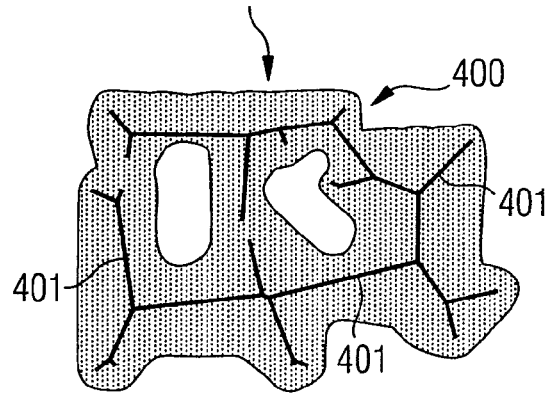
Structure info. + geometry info. enables recursive calculation of area

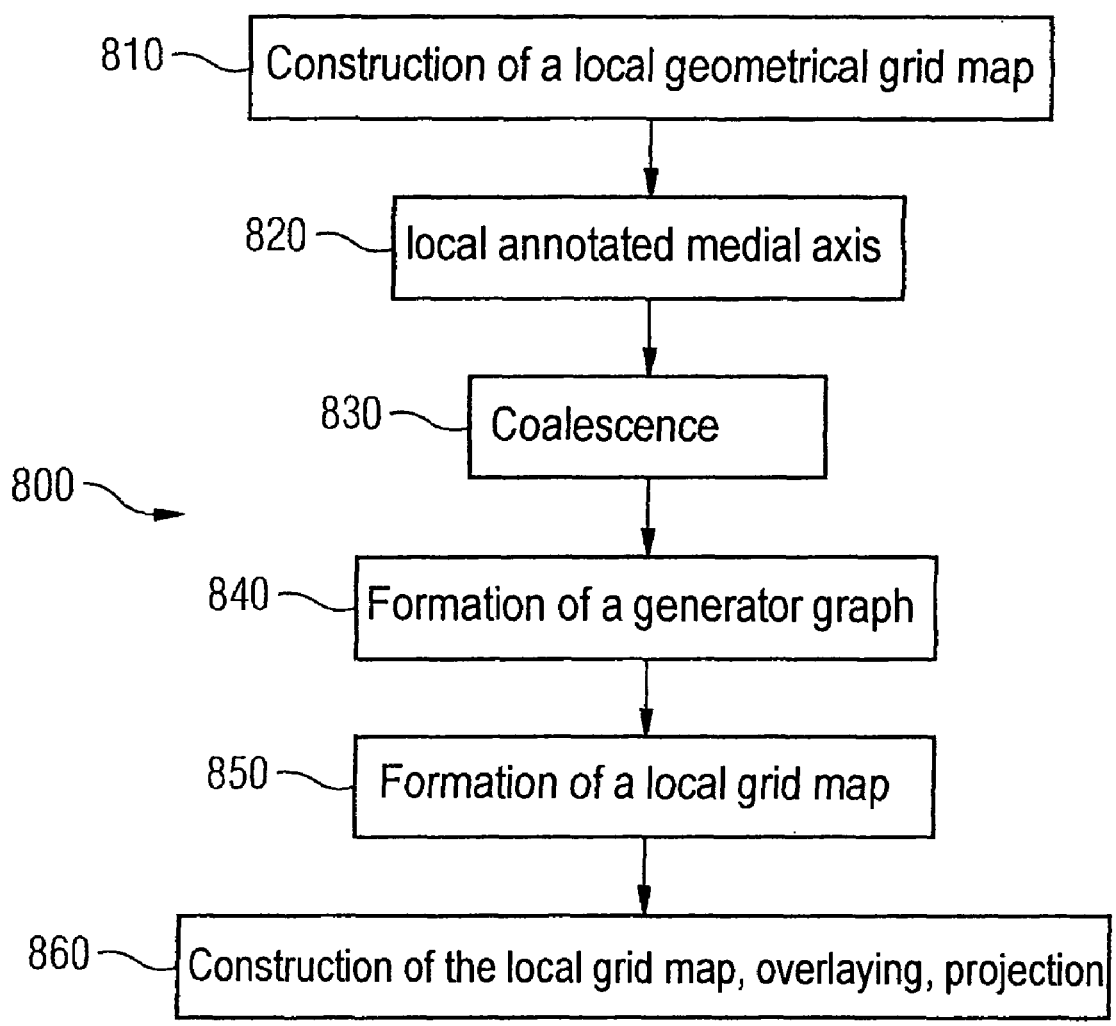

METHOD, SYSTEM, AND COMPUTER PRODUCT FOR FORMING A GRAPH STRUCTURE THAT DESCRIBES FREE AND OCCUPIED AREAS

CROSS REFERENCE TO RELATED APPLICATIONS

This application is based on and hereby claims priority to PCT Application No. PCT/DE03/03121 filed on Sep. 19, 2003 and German Application No. 10249422.3 filed on Oct. 23, 2002, the contents of which are hereby incorporated by reference.

BACKGROUND OF THE INVENTION

The invention relates to generation of a graph structure for description of an area with a free area and an occupied area.

Repetitious activities are being transferred ever more frequently to service robots. Examples of such activities are cleaning tasks, transport tasks, bringing out grain to the appropriate areas or tasks such as lawn mowing.

To execute the relevant area processing the appropriate area processing equipment such as cleaning equipment or cutting equipment is installed on such service robots.

Efficient processing of the areas by the service robots requires that the area processing device covers the entire area to be processed where possible and does not travel down the same path twice where possible.

This however requires planning of a suitable efficient processing path.

Path planning methods in general require a knowledge of the geometrical circumstances of the area to be processed. This includes for example information about the dimensions of the area to be processed and the positions and dimensions of obstacles within it.

As a rule digital, geometrical maps are used in which the relevant geometrical circumstances of the area to be processed are stored. Such geometrical circumstances appear in these geometrical maps as what are known as free areas, for example obstacle-free and processable surfaces, and also as occupied areas, such as areas occupied by obstacles which cannot be processed.

In concrete terms such geometrical maps correspond to what are known as pixel images of which the pixels are assigned image and/or color information in each case. Such pixel images, such as gray scale maps or color images which are used and/or analyzed and evaluated in image processing and/or object recognition also enable a distinction to be made between free areas and occupied areas.

With the appropriate prior knowledge such a digital geometrical map can be created in advance and stored in a service robot. In this case the path planning method or the path planning can be executed in advance. The path to be traveled is known at the start of area processing.

A digital, geometrical map can also be created dynamically during an actual area processing operation. In this case path planning is undertaken during area processing.

Various methods of generating such geometrical maps are known from Sebastian Thrun, "Robotic Mapping: a Survey", February 2002 CMU-CS-02-11, in G. Lakemeyer, B. Nebel (eds.), "Exploring AI in the New Millennium", Chapter 1, Morgan Kaufmann, San Francisco and obtainable from: http://www2.cs.cmu.edu/afs/cs.cmu.edu/user/thrun/public_html/papers/thrun.mapping-tr.html ("the Thrun reference"), A. Elfes, "Occupancy Grids: A Probabilistic Framework for Robot Perception and Navigation", Department of Electrical and Computer Engineering, Carnegie Mellon University 1989 ("the Elfes reference"), and H. P Moravec, "sensors Fusion in certainty grids for mobile robots", AI Magazine, 9(2): 61-74, 1988 ("the Moravec reference").

Path planning methods based on these geometrical maps are also known. Different path planning methods are given as examples below.

So-called template-based methods for full-coverage path planning which use such geometrical maps are known from C. Hofner and G. Schmidt, Path Planning And Guidance Techniques For An Autonomous Mobile Cleaning Robot, International Conference on Intelligent Robots and Systems (IROS), pp. 610-617, 1994, R. Neumann de Carvalho, H. A. Vidal, P. Vieira, and M. I. Ribeiro, Complete Coverage Path Planning and Guidance for Cleaning Robots, IEEE International Symposium on Industrial Electronics, pp. 677-682, 1997, and H. Choset and P. Pignon, Coverage Path Planning: The Boustrophedon Cellular Decomposition, International Conference on Field and Service Robotics, 1997, for example. A further path planning method A. Zelinsky, R. A. Jarvis, J. C. Byarne and S. Yuta, Planning Paths of Complete Coverage of an Unstructered Environment by a Mobile Robot, International Conference on Robotica and Automation (ICRA), pp. 533-538, 1993, which also uses a geometrical digital map, but adopts another approach, uses a potential field, with which an area to be processed is overlaid and a processing path thus determined. Further map-based path planning methods with a similar approach based on geometrical maps are known from E. Prassler, D. Schwammkrug, B. Rohrmoser, and G. Schmidl, Autonomous Road Sweeping of Large Public Areas, Robotik 2000, VDI Reports 1552, VDI Verlag GmbH, Dusseldorf, 2000 and E. Prassler, D. Schwammkrug, B. Rohrmoser, and G. Schmidl, A Robotic Road Sweeper, International Conference on Robotica and Automation (ICRA), pp. 2364-2369, 2000.

As well as being used for determining a processing path, such geometrical maps also serve as the basis for determining the current position or a location of a mobile robot in an area (position estimation). This is referred to as localization or global localization. Furthermore such geometrical maps are also used for orientation and navigation of the robot in an area.

Corresponding methods for localization or global localization, orientation and navigation of mobile robots, based on geometrical maps, are also known, for example from Howie Choset et al., "topology Simultaneous Localization and Mapping (SLAM): Toward Exact Localization Without Explicit Localisation", S. 125-137, IEEE Transactions on Robotics and Automation, Vol. 17, No. 2, April 2001 ("the Choset et al. reference").

The disadvantage of these geometrical maps is that they need significant storage space or are dependent on one type of environment. In addition, for relocalization for example, they require long computing times.

Further disadvantages are the effort involved in the creation of such geometrical maps and that the maps themselves are mostly inaccurate, especially in large and/or unstructured environments.

These geometrical maps thus prove to be of only limited use for the localization of robots in dynamically changing environments Current environments and in some cases those which are subject to just short-term changes, such as a person being in the area, or shelving and such like temporarily placed in the area lead to changed current local section maps, i.e. to changes in the free areas and the occupied areas, and, because of the changes, these sectional maps can only be reflected with difficulty in the geometrical (basic) map.

As a rule this requires time-consuming and memory-intensive correlation procedures. Feature-based search procedures fail if environment elements are changed in such a way that, because they are covered up they can no longer be recognized.

The same problem arises not only in the interpretation of the pixel images as geometrical maps but also for object detection in color images or gray scale maps.

In addition to such geometrical maps, topological maps are also known for localization and navigation of mobile robots in an area.

These topological maps use a graph or a graph structure to describe an area which as a rule is generated from a contiguous sequence of nodes and connectors.

So-called Voronoi Graphs (VG) or Generalized Voronoi Graphs (GVG) the Choset et al. reference, D. Van Zwynsvoorde et al., "Incremental topology Modeling using Local Voronoi-like Graphs", Paper Submitted to IEEE Int. Conf. On Intelligent Robots and Systems, 2000 ("the Zwynsvoorde et al. Incremental topology reference"), D. Van Zwynsvoorde et al., "Building topology models for navigation in large scale environments", LAAS-CNRS, Toulouse, France, 2001 ("the Zwynsvoorde et al. Builing topology reference") as well as the "medial axis" are known examples of these kinds of topologically used or "topological" graphs or graph structures Philip N. Klein et al., "Shape matching using editdistance: an implementation", Twelfth Annual ACM-SIAM Symposium on Discrete Algorithms, SODA 2001, Dept. of Computer Science, Brown Universitiy, Providence ("the Klein et al. reference"), the Choset et al. reference. The "medial axis" (MA) is formed in this case by the locations or the set of circle center points of all circles of a maximum size which lie completely within the enclosed area and touch at least twice.

However these topological graphs only describe free parts of an area, they do not explicitly describe the occupied area or the obstacles in the area and do not describe these in a form such as would make it possible to reproduce the obstacles.

The free areas are described structurally and not metrically in such cases by the graphs, i.e. more precise geometrical information about the area, such as distances or dimensions for obstacles cannot be taken from the graphs as a rule.

Therefore such "topological" graphs, such as Voronoi graphs or medial axis, have only limited suitability for localization or global localization, orientation or navigation of a mobile robot.

A Shock Graph (SG) is known from the Klein et al. reference which is used in this document in image processing or object detection for structural description of areas and shapes enclosed by outlines.

SUMMARY OF THE INVENTION

One possible object of the invention is to provide a description of an area with free areas and occupied areas which is simple to determine and to represent and also requires little memory space.

In addition it is however to include sufficient information and especially information that remains robust if environmental circumstances change, to enable it to be used for object detection in image processing, as well as for localization or relocalization, orientation or navigation of a mobile robot, especially in dynamic environments.

The inventors propose a method for generation of a graph structure for description of an area with a free area and an occupied area a topological graph structure for the free area of the area is determined. At least one point of the topological graph structure is selected. For the selected point of the topological graph structure a nearest adjacent occupied point in the area is determined, which nearest point lies in an occupied area and features a shortest distance to the selected point of the topological graph structure. Location information is determined for the nearest adjacent point in the occupied area. The graph structure is at least formed from the selected point of the topological graph structure and from the associated location information of the nearest adjacent obstacle point.

The system for generating a graph structure to describe an area with a free area and an occupied area refers to the following units which are in contact with one another, a structure determination unit with which a topological graph structure for the free area of the area can be determined, a selection unit with which at least one point of the topological graph structure can be selected, with a unit for identifying obstacles, with which a nearest point in the occupied area can be determined for a selected point of the topological graph structure, this nearest occupied point lying in an occupied area and features a shortest distance to the selected point of the topological graph structure, with a location determination unit with which location information for the nearest adjacent occupied area point can be determined, with a structure generation unit, with which the graph structure can be formed from at least the selected point of the topological graph structure and from the associated location information of the nearest occupied area point.

Viewed in concrete terms, by contrast to known digital geometrical maps, in which the entire area with all occupied areas or obstacles is stored, the invention only stores the form and topology of a free area in efficient form, in this case using a topologically employed or "topological" graph or graph structure, such as for example a Shock Graph, a "medial axis" or a Voronoi Graph.

If required but not necessarily, these topological graphs or graph structures can be enriched (annotated) by suitable further information, for example displacement information, which for example leads to a so-called annotated medial axis. These types of annotated topological graphs are however—as a special embodiment of topological graph structures—still topological graphs in the sense of the invention.

In this context reference is made to document previously unpublished German Patent Application with the official Designation DE 102 47 772.8 ("DE '772") which describes the generation of topological graph structures in general and the formation of annotated topological graphs in particular, as well as making further statements related to the present invention. Thus document DE '772 is fully part of the present embodiments.

Starting from the topological graph, at least one point is selected and for this the nearest obstacle point, i.e. nearest adjacent point of an occupied area—as a rule a point on an edge of the nearest obstacle or the nearest occupied area—is determined. For this nearest occupied area point or obstacle point, referred to as a generator, security information is determined, which uniquely describes the position of the generator (relative to the selected point of the topological graph or in absolute terms).

Thus for example the location information of the generator can be coordinates of the latter.

The graph structure, also referred to below as the generator graph, is formed from at least the selected point of the topological graph structure and from the associated location information of the generator.

It is especially advantageous that the graph structure or the generator graph formed in this way is robust as regards changes in the area, i.e. as regards environment dynamics. The use of the generator makes a major contribution here.

This means that the invention opens up a wide area of application, namely wherever digital pixel images are used. Thus the invention is especially suited to the localization of mobile units as well as specifically for object recognition, as well as for image processing in general.

The computer program is designed to execute all steps when the program is run on a computer.

The computer program product stored in machine-readable form on a data medium is set up to execute all the steps in accordance with the method in accordance with the invention when the program is run on a computer.

The system and also the computer program product set up to execute all steps in accordance with the inventive method when the program is run on a computer, as well as the computer program product stored on a machine-readable medium, set up to execute all steps in accordance with the inventive method when the program is executed on a computer are especially suited to execute the method in accordance with the invention or of one of its further developments listed below.

The developments described below relate to both the method and to the system.

The method can be implemented both in software and also in hardware, for example by using an application specific integrated circuit.

Further the realization or of a development described below is possible through a computer-readable storage medium on which a computer program product is stored which executes the method.

Also the method described below can be realized by a computer program product which features a storage medium on which a computer program product is stored which executes the method.

Shock Graphs the Klein et al. reference or a "medial axis" the Klein et al. reference, the Choset et al. reference or also Voronoi Graphs the Choset et al. reference, the Zwynsvoorde et al. Incremental topology reference, the Zwynsvoorde et al. Builing topology reference or corresponding methods for forming the types of graphs given as examples can be used to form the topological graph structure. The graphs generated as a rule feature a sequence of nodes and connectors.

With a further development the location information of the nearest adjacent occupied point in the area or obstacle is relative location information with regard to the selected point, especially displacement information and direction information. Alternatively the location information can also be absolute location information, especially coordinates of the nearest occupied area point or obstacle point.

It also makes sense to select a plurality of points of the topological graph structure for which a plurality of selected points of the nearest occupied area point or obstacle point are determined in each case. The graph structure or the generator graph is then formed from all selected points and the associated location information.

When the one or more selected points are chosen a regularity of the topological graph structure can be taken into account. The more regular the topological graph structure is, the fewer selected points are sufficient to describe the topological graph structure. But in such cases an interpolation between the selected points approximates to the underlying graph structure.

Further it can be useful for one or more nodes of the topological graph structure to be chosen as the selected point or the selected points.

However it should be noted that in principle each point of the topological graph structure can be selected without restricting its general applicability.

It is also possible for the selected point of the topological graph structure to determine at least one further nearest obstacle point or a plurality of further nearest obstacle points for which the associated location information will then be determined. These can then also be taken into consideration for the formation of the graph structure.

In combination with the further developments proposed below it is possible to select a node point of the topological graph structure and to determine for the node point at least two nearest adjacent occupied area points or obstacle points and their associated location information.

As a development the topological graph structure can be supplemented by the graph structure.

Furthermore the topological graph structure can be determined by using a geometrical map of the area, especially a local geometrical grid map, and/or by using sensor measurements which generate distance information, especially laser measurements, ultrasound measurements or measurements from video systems.

Further the method can be used to describe an overall area having a plurality of areas by using an overall graph structure, thus for image processing, for image encoding and/or a description of geometrical map.

In this case the graph structure is determined for a plurality of areas in each case. The graph structure is then merged to form the overall graph structure.

With a further development in the environment of a localization task a local grid map is created for a part area of the overall area. A subgraph structure of the overall graph structure is selected, in which case the subgraph structure contains at least one selected point of the location information of the at least one associated nearest adjacent obstacle point. The selected subgraph structure is compared with the local grid map, for example through overlaying or correlation, in which case the nearest obstacle points of the subgraph structure are reproduced. Further the overlaid nearest adjacent obstacle point reproduced is then compared with an obstacle point of the local grid map.

Developing the above approach, a plurality of subgraph structures of the overall structure can be selected, of which each will be overlaid with the local grid map. Depending on the relevant comparison the local grid map is assigned to one of the selected subgraph structures. Information about a position or for localization can then be derived from this, for example in such a way that the subgraph structure assigned to the local grid map describes a position to be localized.

Furthermore the method described can be used for a localization and/or navigation of a mobile unit. In this case the mobile unit is localized as described using the graph structure and/or navigated using the graph structure.

The topological graph structure can further be determined using a geometrical map of the area, especially of a local geometrical grid map, and/or using sensor measurements generating distance information, especially laser/ultrasound measurements or measurements from video systems.

The method can also be used for the construction of larger, global area descriptions, i.e. correspondingly structured maps.

In this case the associated graph structure is determined in each case for a plurality of areas of an overall area. Subsequently the graph structures of the areas are combined or merged into an overall graph structure, the structured map.

As a development this structured map of the overall area or of the overall map structure can also now be used for a localization, for example of a mobile unit, which is moving or is located in a part of the overall area.

For this purpose the associated graph structure is determined for this part or this part area. Subsequently the graph structure of the part area is compared with the overall graph structure and the graph structure of the subgraph structure corresponding to the part area is determined in the overall graph structure. On the basis of the subgraph structure or its position in the overall graph structure the mobile unit can be localized.

To perform the comparison various procedures based on known methods are available such as for example a hierarchical exclusion procedure and/or statistical matching procedure and/or a "constraint propagation" method. Security during comparison can be increased it necessary if the given methods are applied in combination with each other.

In further developments the method can especially be used with mobile units such as mobile robots. In this case using the method of operation, tasks for mobile units such as a localization, orientation and/or path planning tasks can be resolved.

In such cases the mobile unit is localized using at the graph structure and/or navigated using the latter.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 is a sketch of a global overall graph annotated with distance information all of an overall area (color-coded or of the medial axis annotated with Distance Information an overall area (color-coded);

FIG. 4 is a sketch of a global overall graph annotated with Distance Information of an overall area with obstacles reconstructed from a distance information reference lines of the a free area;

FIG. 8 is a sketch of procedural steps for the localization of a mobile robot in accordance with an exemplary embodiment;

DETAILED DESCRIPTION OF THE PREFERRED EMBODIMENT

Figure 1:
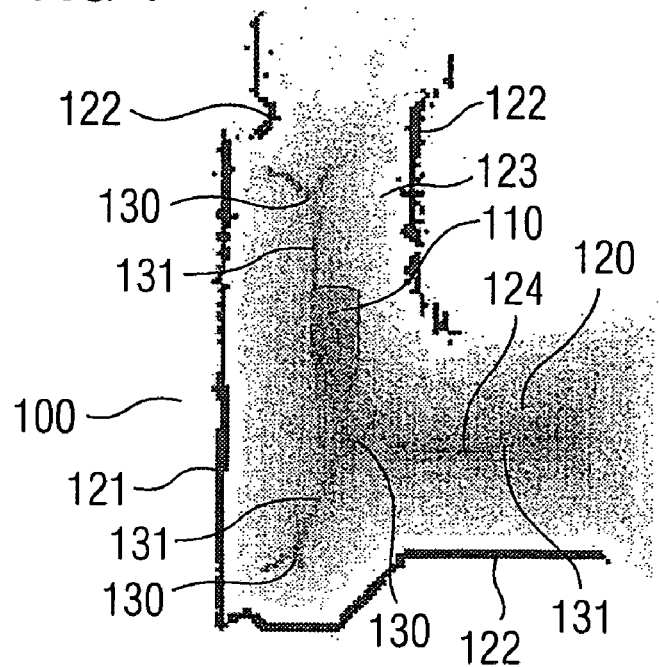
FIG. 1 is a sketch of a local geometrical grid map.

Reference will now be made in detail to the preferred embodiments of the present invention, examples of which are illustrated in the accompanying drawings, wherein like reference numerals refer to like elements throughout.

Exemplary embodiment Localization of a mobile robot in an overall area by a generator graph formed by a topological graph FIG. 8 shows procedural steps 810 to 860 (FIG. 8, 800) for a localization of an autonomous mobile robot in and overall area by a generator graph formed using a topological graph.

The mobile robot, in the embodiment a cleaning robot, is equipped with items such as cleaning equipment, a plurality of laser scanners, sensors for measuring displacements and distances as well as a computation or evaluation unit.

The overall area 500 (cf. FIG. 5), in the embodiment an area to be cleaned, is restricted on all sides by walls 501 and obstacles 502 placed against the walls 501, such as shelves and cupboards. There are also further different obstacles 503 in the overall area 500 which are to be considered for cleaning with a mobile robot.

For autonomous operation of the robot its laser scanners continuously record images of an environment of the robot and feed the images taken to the robot's computation unit. Here the images are stored and evaluated further.

The further evaluation of the images also includes the localization procedure described below 800 in accordance with FIG. 8 with the procedural steps 810 to 860 together with FIGS. 1 to 7 as well as 9 to 11

FIG. 8 shows:

Procedural step 1) Ongoing construction of a local geometrical grid map of an environment (810; FIG. 1), Procedural step 2): Construction of a local graph enriched by distance information (local, annotated medial axis; 820), Procedural step 3) coalescence of locally annotated graphs into a global annotated graph structure (830), Procedural step 4) Formation of a generator graph from the global annotated graph structure through supplementary references to generators (840; FIGS. 9a-9c, 10a and 10b), Procedural step 5) formation of a local grid map (pixel map; 850), Procedural step 6) Finding the part of the generator graph associated with the local grid map (localization; 860; FIGS. 11a-d).

Procedural Step 1) Ongoing Construction of a Local Geometrical Grid Map of an Environment (810; FIG. 1)

FIG. 1 shows a local geometrical grid map 100 of the local, i.e. nearer, environment of the mobile robot 110 and thereby of the local section of the overall area. Such a local geometrical grid map 100 is constantly created and or constructed or stored during the journey of a mobile robot 110.

To this end the mobile robot 100 constantly "scans" the environment during its journey by its laser scanner, creates pictures of its environment in this way and from these creates the local, geometrical grid maps.

Simultaneously, by the sensors, displacements and distances to the walls 121 and obstacles 122 are determined and these are integrated into local geometrical maps 100 (displacement map, cf. procedural step 6)).

The corresponding methods for creation or construction of such local, geometrical grid maps are described in the Thrun reference, the Elfes reference, and the Moravec reference.

In this case the local, geometrical grid map 100 described in FIG. 1 shows a passage 120 which is limited through the walls 121 and the obstacles 122. Areas not blocked by obstructions are also referred to as free areas.

Figure 2:
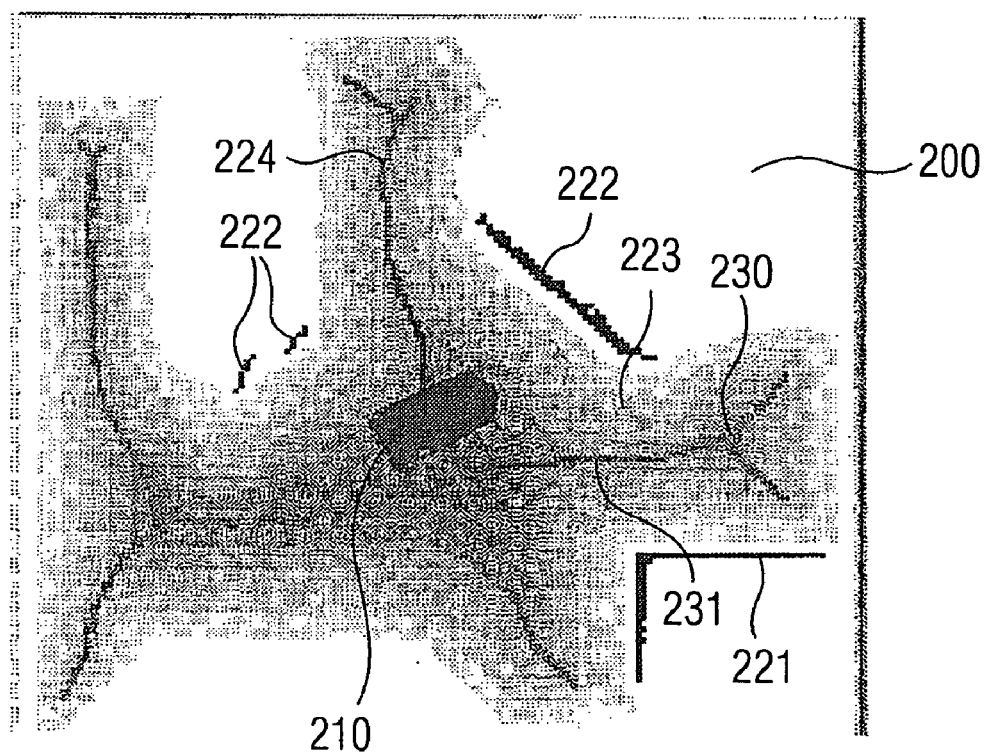
FIG. 2 is a sketch of a local subgraph annotated with distance Information of a subarea or a medial axis of the subarea annotated with distance Information.

Procedural Step 2) Construction of a Local Graph Enriched by Displacement Information (Local, Annotated Medial Axis, FIG. 1 and FIG. 2)

Starting from such a local geometrical grid map 100, 200 as well as using the corresponding displacement information for the walls 121, 221 and the obstacles 122, 222 a "medial axis" 124, 214 annotated with the displacement information is defined in the free area 123, 223.

First a non-annotated "medial axis" is determined here. Corresponding methods for determining a non-annotated "medial axis" are described in the Klein et al. reference, the Choset et al. reference. In this case the created, non-annotated "medial axis" features a sequence of nodes 130, 230 and connectors 131, 231.

These, i.e. both the connectors 131, 231 and also the nodes 130, 231, are subsequently assigned the relevant associated displacement information (annotated).

The information is assigned such that the distance or the displacement to the nearest object, i.e. to the next nearest obstacle 122, 222 or the next nearest wall 121, 221 is assigned to each node 130, 230 and each connector 131, 231. This annotates the initially unannotated "medial axis" and thereby enriches it with the displacement information.

Numerical displacement values or distances are assigned, in which case, to clarify the annotated "medial axis" this is shown color-coded in accordance with the relevant assigned displacement values in the local geometrical grid map 100, 200.

Procedural Step 3) Coalescence of Local Annotated Graphs Into a Global, Annotated Graph Structure (FIG. 3 and FIG. 4).

During the journey of a mobile robot 110, 210 the local, annotated graphs or "medial axis" 224, 324 determined are now fused or coalesced into a global annotated environment graph 325, 400 (global annotated graph structure).

To this end new parts of a local, annotated graph 324, 401 are added to the global, annotated environment graphs 325, 400 and/or part of the global, annotated environment graph 325, 400 is replaced by part of a local, annotated graph 324, 401.

To add new parts of the graph or to replace parts of the graph the decision has to be made as to which parts of the graph are new. This is done by "matching" two local, annotated graphs and/or "matching" a local, annotated graph with the global, annotated environment graph, taking account of the movement of the mobile robot in each case.

The starting point at the beginning of the coalescence is the partly existing and stored global, annotated environment graph or—if such a graph does not yet exist—of a local, annotated graph, which is expanded or built into the global, annotated environment graph.

Figure 6:
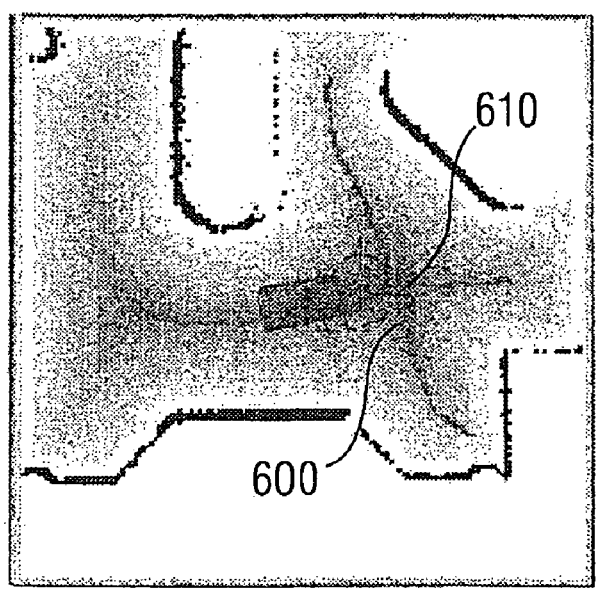
FIG. 6 is a sketch of a local subgraph annotated with displacement Information of that subarea in which the mobile robot from FIG. 5 is currently located.
Figure 7:
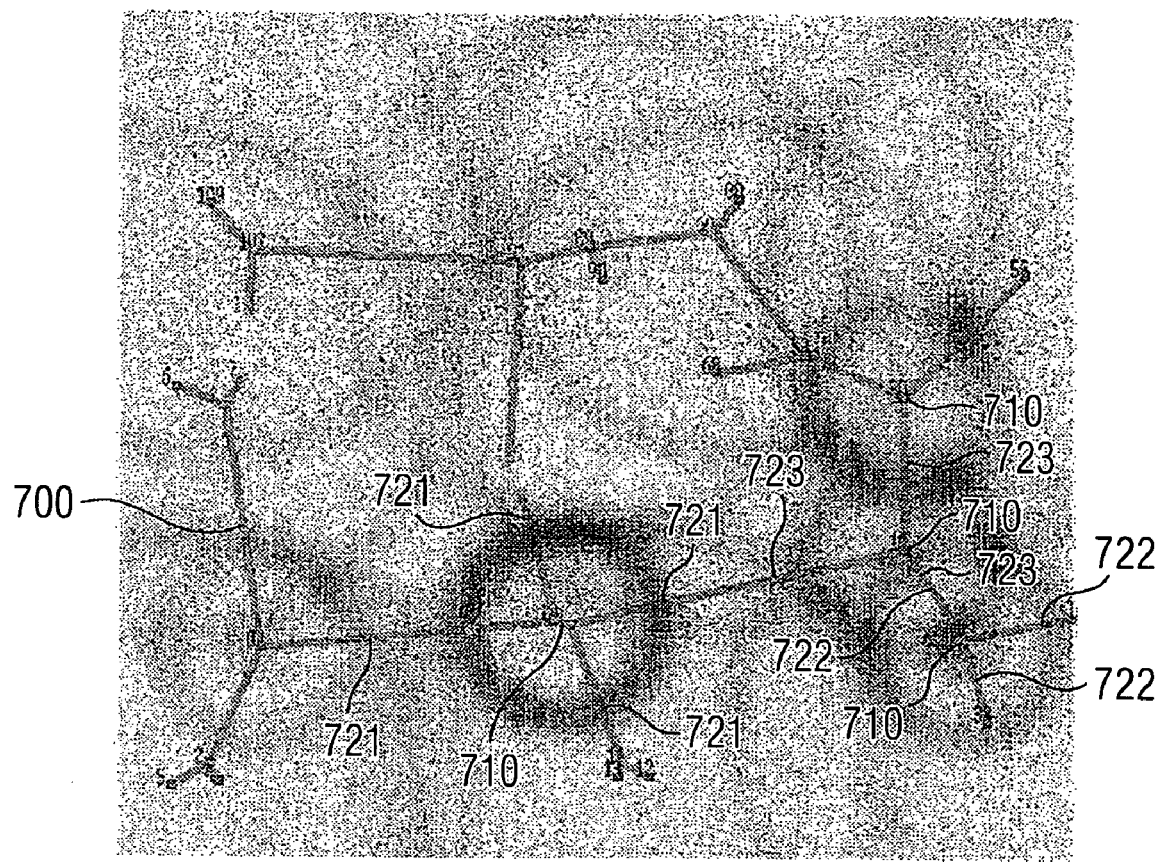
FIG. 7 is a sketch of a global overall graph annotated with displacement information of the overall area from FIG. 5 with color-coded position probabilities of the mobile robot at nodes of the overall graph (localization)

At the end of the coalescence there is a completely constructed global, annotated environment graph of the overall area. FIGS. 6 and 7 show further sketches of annotated environment graphs.

Procedural Step 4) Formation of a Generator Graph From the Global, Annotated Graph Structure or the Environment Graph Through Supplementary References to Generators (840; FIGS. 9a-9c, 10a and 10b)

Figure 9A:
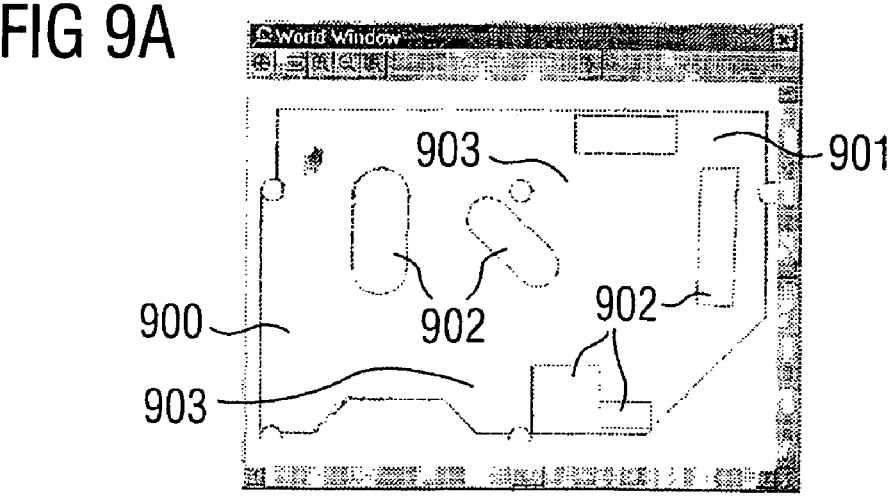
FIG. 9a to FIG. 9c are sketches of an overall area to be processed by a mobile robot with obstacles (environment) with the mobile robot at a current position (FIG. 9a), Sketch of the associated medial axis of the overall area (FIG. 9b) as well as sketch of the medial axis of the overall reduced to the selected points (FIG. 9c)

FIG. 9a shows a geometrical grid map 900 of the environment 901 of the mobile robot 110 and thereby of the overall area 901 to be processed by robot 110.

Obstacles 902 as well as free areas 903 can be seen in the overall area 901

Figure 9B:
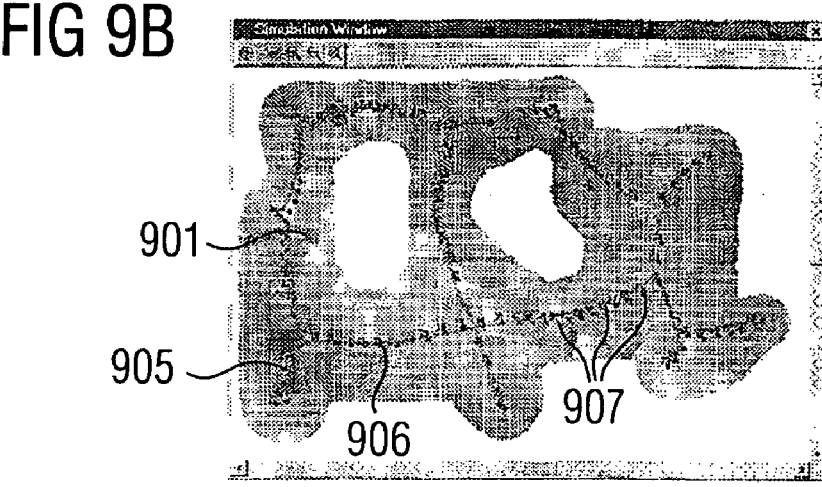

FIG. 9b shows the global, annotated environment graph 905 of this overall area 901. The path of the medial axis 906 is illustrated by a plurality of medial axis points 907.

Figure 9C:
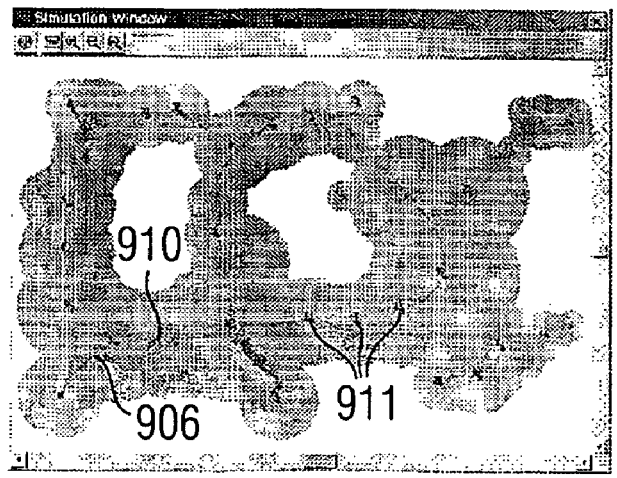

FIG. 9c a "reduced" environment graph 910 obtained from the global, annotated environment graph 905.

With this reduced environment graph 910 various points are selected from the plurality of medial axis points 907 which selected medial axis points 911 also sketch the path of the medial axis 906.

Figure 10A:
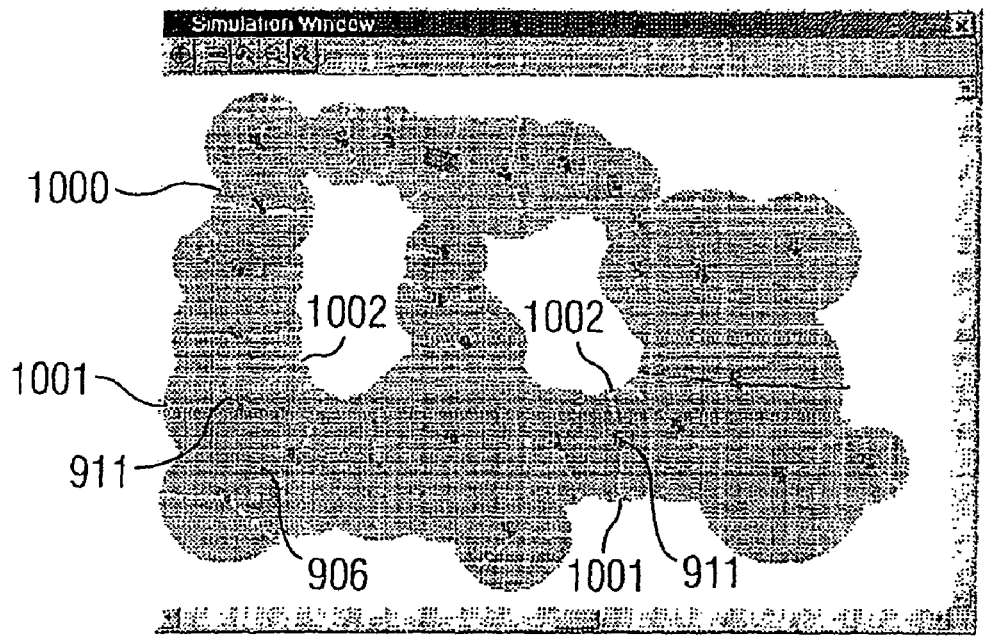
FIG. 10a and FIG. 10b are sketches of a medial axis of the overall area reduced to selected points with associated generators (generator graph)
Figure 10B:
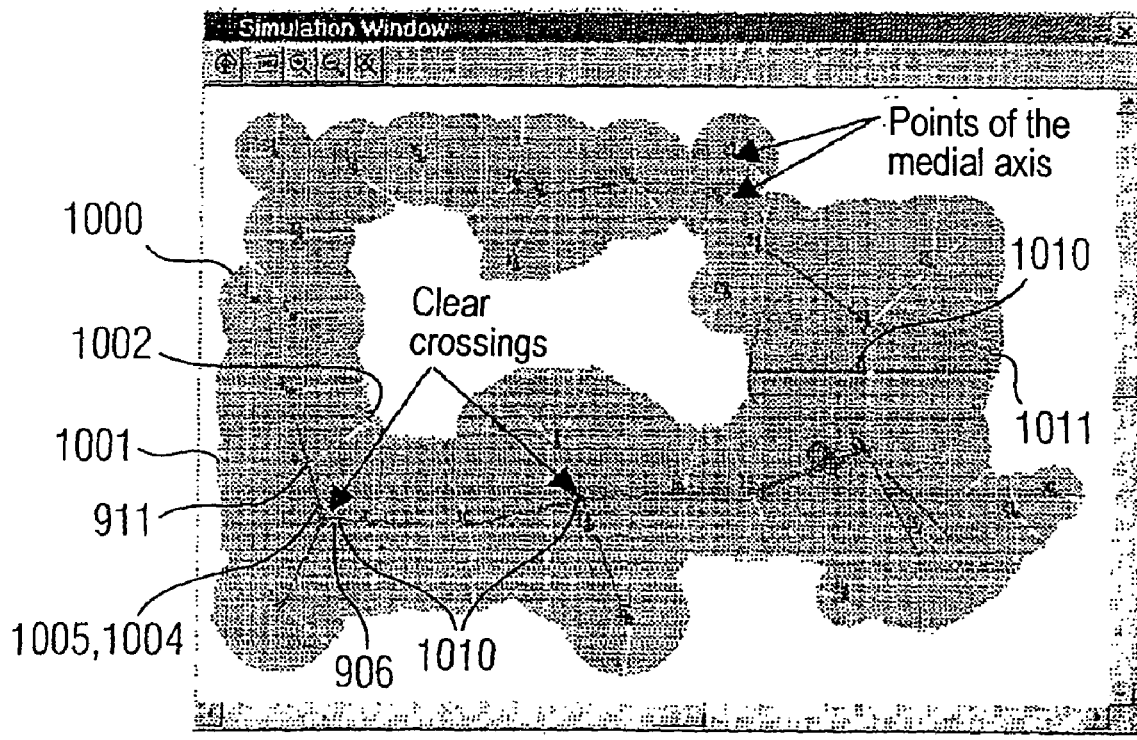

On the basis of the reduced environment graph 910 the generator graph 1000 shown in FIGS. 10a and 10b is created.

To this end the two next edge pixels 1001 or 1002 are determined for each selected medial axis point 911. Since these edge pixels 1001, 1002 span the medial axis 906 they are also referred to as generators.

The generators 1001, 1002 are stored together with the selected medial axis points 911 in the generator graph 1000 (FIG. 10a).

In addition there are points 1005 on the medial axis 906 which have more than two generators 1001, 1002 (FIG. 10b). These points 1005 are the crossings 1004. Crossings 1004 are of interest for localization since they lie at a canonical position. They can therefore be used as a landmark.

The crossings 1004 or these points 1005 are also stored in the generator graph because they are helpful for the localization.

In addition the mid point or medial axis points 1010 of the circles 1011 which have a maximum displacements from the edge are stored. The configuration of these points 1010, as well as the width of the free area at the location are information, which can determine the signature of a crossing.

Procedural Step 5) Forming a Local Grid Map (Pixel Map, cf. FIG. 11 1102; 850)

Figure 5:
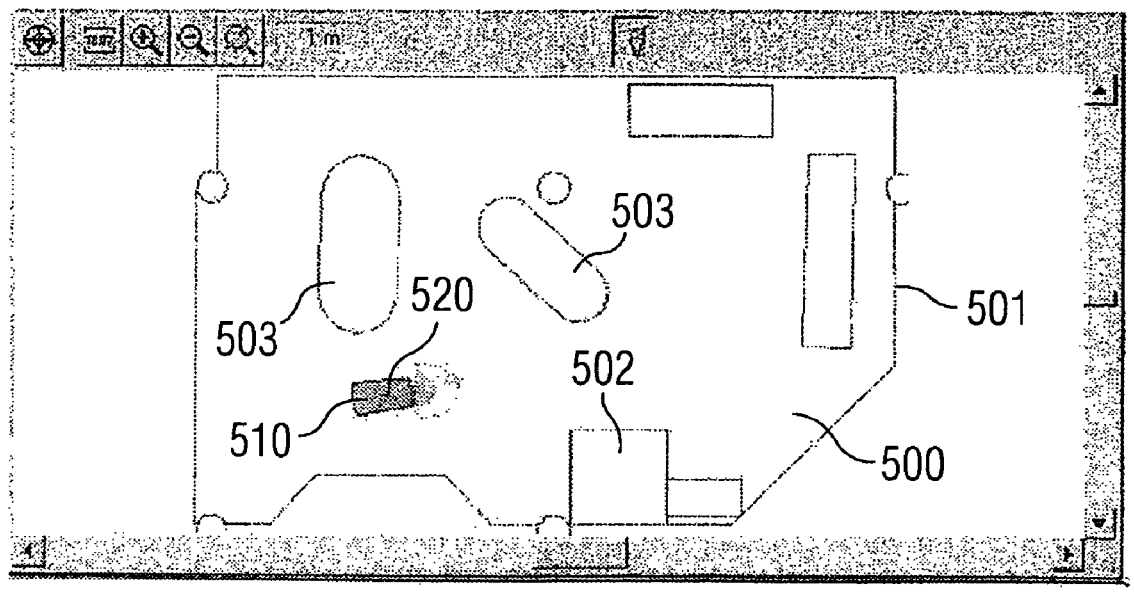
FIG. 5 is a sketch of an overall a airier with obstacles to be processed by a mobile robot (Environment) with the mobile robot at a current position.

FIG. 5 shows the mobile robot 510 at a position 520 in the overall area 500 which is not known for it.

At this unknown position 520 the mobile robot 510 creates a local geometrical grid map 1102 according to the known procedures described above (cf. procedural step 1)).

To do this the mobile robot 100 "scans" the environment at the position not known to it, creates an image of the environment in this way and from this creates the local, geometrical grid map (pixel map, 1102).

If necessary this pixel map 1102 can be expanded further into a displacement map (cf. procedural step.

Procedural Step 6): Finding the Part of the Generator Graph Associated with the Local (Geometrical) Grid Map (Position Determination and Localization; 860; FIGS. 11a-d).

The task for localization or position determination is now to determine those subgraphs of the generator graph which describe the local geometrical grid map—determined at the unknown position (cf. procedural step 5)). This is done by comparison or overlaying or projection of an assumed part generator graph 1101 with the pixel map 1102.

For the localization the comparison is not now undertaken at the level of the topological graph structure or at the level of the medial axis, but one or two levels lower, meaning at the level of the displacement map (cf. procedural step 1)) or even at the level of the pixel map 1102.

The displacement map is produced, as previously described (cf. procedural step 1)) as an intermediate step in the generation of the medial axis. It contains the displacement of a pixel from the next obstacle or to the next obstacle edge.

In the ideal case this displacement should be zero for all projected pixels during the localization, or at least very small, also with any additional obstacles.

Figure 11A:
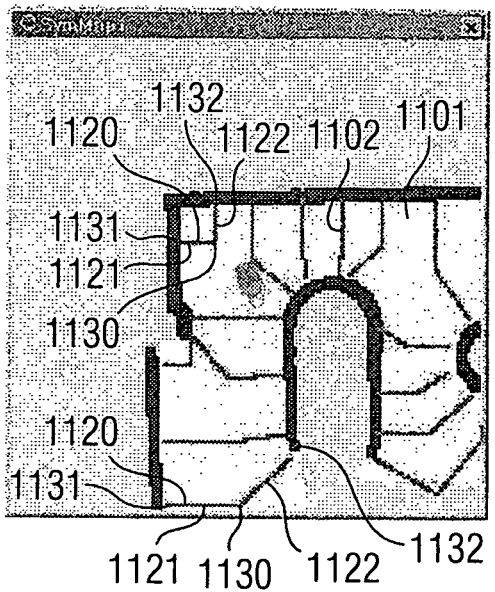
FIG. 11a to FIG. 11d are sketches which describe the use of a generator graph for a localization of a mobile robot.
Figure 11B:
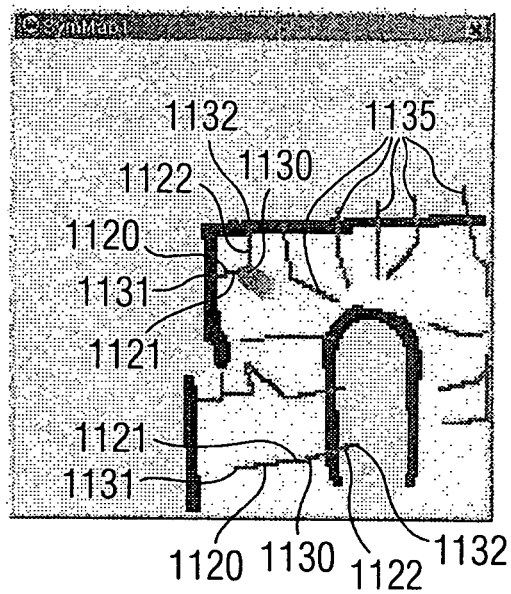

FIG. 11a shows an overlaying or projection or an assumed part generator graph 1101 with the pixel map 1102 for a correct assumption or position assumption. FIG. 11b shows the overlaying for an incorrect assumption or position assumption.

Each drawn line 1120 in FIGS. 11a to 11d has precisely two equally long paths 1121 or 1122, starting from a medial axis point 1130 (medial axes not shown) through to the two generators 1131 or 1132 of this point 1130.

If the assumed position is correct these routes 1121, 1122 always end at or near obstacle edges (FIG. 11a) or the generators 1131, 1132 come to lie on obstacle edges.

If the assumed position is incorrect displacements 1135 are produced between the generators 1131, 1132 and obstacle edges. These displacements 1135 can be used as a measure (overall displacement measure) for the quality of the assumption or as a measure for the matching of the overlaying.

Figure 11C:
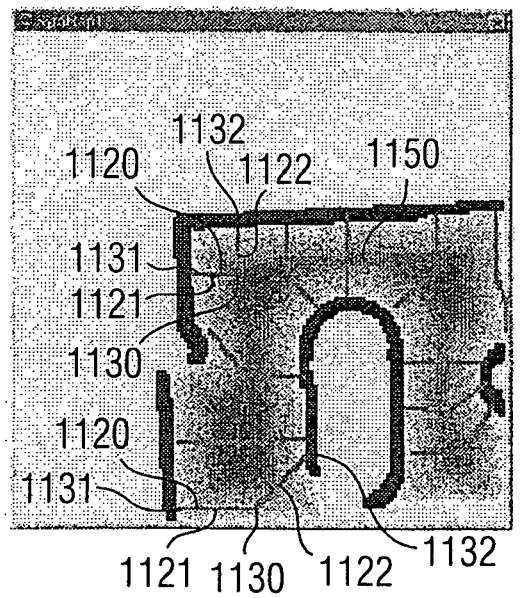
Figure 11D:
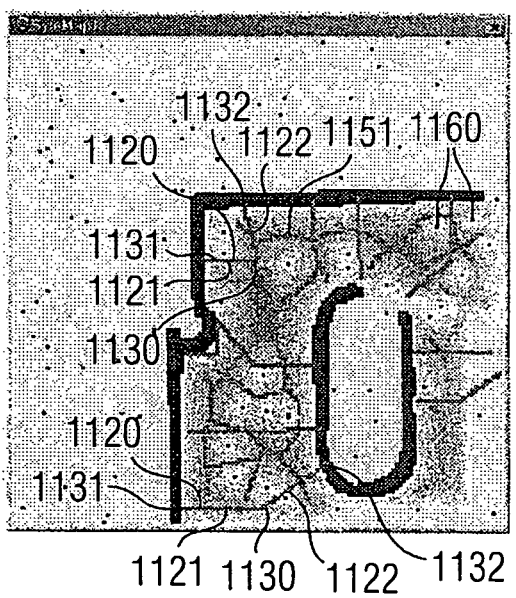

The robustness of the generator graph 1101 in respect of environment dynamics is clearly shown in FIGS. 11c and 11d.

FIGS. 11c and 11d show the change of the medial axis 1150 or 1151 for an environment dynamic, in this case persons simulated by points 1160.

FIGS. 11c and 11d show a clear change in the center axis 1150 or 1151 for the obstacles produced by the environment dynamics, in this case the persons 1160. This makes it difficult to make a comparison at the level of the medial axis.

For the comparison at the level of the generator graph 1101 or the generators 1131, 1132 not much changes for environment dynamic.

A likelihood that with an incorrect position assumption a generator 1131, 1132 will fall on an obstacle edge produced by the environment dynamic is slight.

The invention has been described in detail with particular reference to preferred embodiments thereof and examples, but it will be understood that variations and modifications can be effected within the spirit and scope of the invention.

The invention claimed is:

1. A method implemented in a computer for forming a graph to describe a location having a free area and an occupied area, comprising:
   determining a topological graph structure for the free area;
   selecting a point in the topological graph structure;
   for the selected point of the topological graph structure, determining an adjacent occupied area;
   selecting an occupied point for the adjacent occupied area, the occupied point being at a shortest distance to the selected point of the topological graph structure;
   determining associated location information for the occupied point;
   forming the graph from the selected point of the topological graph structure and from the associated location information for the occupied point;
   determining a local grid map for a portion of the location;
   comparing the local grid map with the graph;
   determining a position of the local grid map with respect to the graph based on the comparison; and
   using information from the local grid map to supplement the graph, at the position, wherein
   the location has a plurality of sub-areas and the graph is formed by combining graphs for the plurality of sub-areas.

2. The method according to claim 1, wherein
the topological graph structure is determined using a Shock graph, a "medial axis" or a Voronoi graph.

3. The method in accordance with claim 1, wherein
the associated location information for the adjacent occupied area is relative location information with regard to the selected point, including displacement information and direction information, the direction information comprising an angle specification.

4. The method in accordance with claim 1, wherein the associated location information for the adjacent occupied area is absolute location information comprising coordinates of the adjacent occupied area.

5. The method in accordance with claim 1, wherein
a plurality of points are selected in the topological graph structure,
for each selected point an occupied point is selected and location information is determined, and
the graph structure is formed from all selected points and the associated location information.

6. The method according to claim 4, wherein
the selected points are selected depending on a regularity of the topological graph structure, and
fewer points are selected for a more regular topological graph structure.

7. The method in accordance with claim 1, further comprising:
for the selected point of the topological graph structure, determining at least one additional adjacent occupied area;
selecting an occupied point for each additional occupied area; and
determining associated location information for each additional occupied area.

8. The method according to claim 7, wherein
a node point is selected in the topological graph structure, and
for the node point, at least two adjacent occupied areas are determined, occupied points are selected and associated location information is determined.

9. The method in accordance with claim 1, wherein
the topological graph structure is determined using sensor measurements generating distance information, the sensor measurements being selected from the group consisting of laser measurements, ultrasound measurements and measurements of video systems.

10. The method in accordance with claim 1, wherein
the topological graph structure is determined using a local geometrical map of the free area.

11. The method according to claim 1, wherein the local grid map is compared with the graph by overlaying the local grid map and the graph.

12. The method according to claim 1, wherein
the local grid map is compared with the graph by individually comparing the local grid map with the graphs for the sub-areas.

13. The method according to claim 1, wherein
the local grid map is determined using information from a mobile unit,
the mobile unit continually generates local grid maps as the mobile unit moves, and
the graph is continually updated.

14. A method implemented in a computer for forming a graph to describe a location having a free area and an occupied area, comprising:
determining a topological graph structure for the free area;
selecting a point in the topological graph structure;

for the selected point of the topological graph structure, determining an adjacent occupied area;
selecting an occupied point for the adjacent occupied area, the occupied point being at a shortest distance to the selected point of the topological graph structure;
determining associated location information for the occupied point;
forming the graph from the selected point of the topological graph structure and from the associated location information for the occupied point;
determining a local grid map for a portion of the location, at an unknown position within the location;
comparing the local grid map with the graph; and
determining the position of the local grid map with respect to the graph based on the comparison.

15. The method according to claim 14, wherein
the location has a plurality of sub-areas,
the graph is formed by combining graphs for the plurality of sub-areas,
the local grid map is compared with the graph by individually comparing the local grid map with the graphs for the sub-areas.

16. The method in accordance with claim 14, wherein
the local grid map is determined using information from a mobile unit, and
the mobile unit is navigated through the location using the graph.

* * * * *